US011625251B1

(12) United States Patent
Agrawal et al.

(10) Patent No.: US 11,625,251 B1
(45) Date of Patent: Apr. 11, 2023

(54) MECHANISM FOR REDUCING COHERENCE DIRECTORY CONTROLLER OVERHEAD FOR NEAR-MEMORY COMPUTE ELEMENTS

(71) Applicant: Advanced Micro Devices, Inc., Santa Clara, CA (US)

(72) Inventors: Varun Agrawal, Santa Clara, CA (US); Yasuko Eckert, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/561,112

(22) Filed: Dec. 23, 2021

(51) Int. Cl.
    *G06F 9/38* (2018.01)
    *G06F 9/30* (2018.01)
    *G06F 12/0815* (2016.01)
    *G06F 13/16* (2006.01)

(52) U.S. Cl.
    CPC ........ *G06F 9/3895* (2013.01); *G06F 9/30036* (2013.01); *G06F 9/30105* (2013.01); *G06F 12/0815* (2013.01); *G06F 13/1668* (2013.01)

(58) Field of Classification Search
    CPC ............. G06F 9/30036; G06F 9/30105; G06F 9/3895; G06F 12/0815; G06F 13/1668
    See application file for complete search history.

(56) References Cited

U.S. PATENT DOCUMENTS

| 7,882,307 | B1* | 2/2011 | Wentzlaff | G06F 12/0815 |
| | | | | 711/119 |
| 2005/0005073 | A1* | 1/2005 | Pruvost | G06F 1/3287 |
| | | | | 713/320 |
| 2005/0216672 | A1* | 9/2005 | Gschwind | G06F 12/0862 |
| | | | | 711/E12.027 |
| 2015/0370712 | A1* | 12/2015 | Cheng | G06F 11/10 |
| | | | | 711/135 |
| 2021/0349837 | A1* | 11/2021 | Huangfu | G06F 9/5016 |

* cited by examiner

*Primary Examiner* — Zachary K Huson
(74) *Attorney, Agent, or Firm* — Hickman Becker Bingham Ledesma LLP

(57) ABSTRACT

A parallel processing (PP) level coherence directory, also referred to as a Processing In-Memory Probe Filter (PimPF), is added to a coherence directory controller. When the coherence directory controller receives a broadcast PIM command from a host, or a PIM command that is directed to multiple memory banks in parallel, the PimPF accelerates processing of the PIM command by maintaining a directory for cache coherence that is separate from existing system level directories in the coherence directory controller. The PimPF maintains a directory according to address signatures that define the memory addresses affected by a broadcast PIM command. Two implementations are described: a lightweight implementation that accelerates PIM loads into registers, and a heavyweight implementation that accelerates both PIM loads into registers and PIM stores into memory.

20 Claims, 6 Drawing Sheets

FIG. 2

```
                MEMORY ADDRESS CONFIGURATION 250

16 bit memory address space
Bit 0: Memory Channel (2 channels)
Bits 1~4: Memory Bank (16 banks)
Bits 5~15: Memory Cell (2048 cells, each cell 32 bytes)
```

```
              PP LEVEL COHERENCE DIRECTORY 260A

Channel 0:
ENTRY       SIGNATURE (Bits 5~15)      SIGNATURE CLEAN BIT
0           1101 1111 001              1
1           1101 1111 010              0
...                                    ...

Channel 1:
...
```

```
              PP LEVEL COHERENCE DIRECTORY 260B

Channel 0:
ENTRY       SIGNATURE (Bits 5~15)   COHERENCE INDICATORS
0           1101 1111 001           0,1,2,0,0,0,0,0,0,0,0,0,0,0,0,0
1           1101 1111 010           0,0,0,0,0,0,0,0,0,0,0,0,0,0,0,0
...                                 ...

Channel 1:
...
```

```
              COHERENCE INDICATOR LEGEND 270

0 = Not cached
1 = Clean
2 = Dirty
```

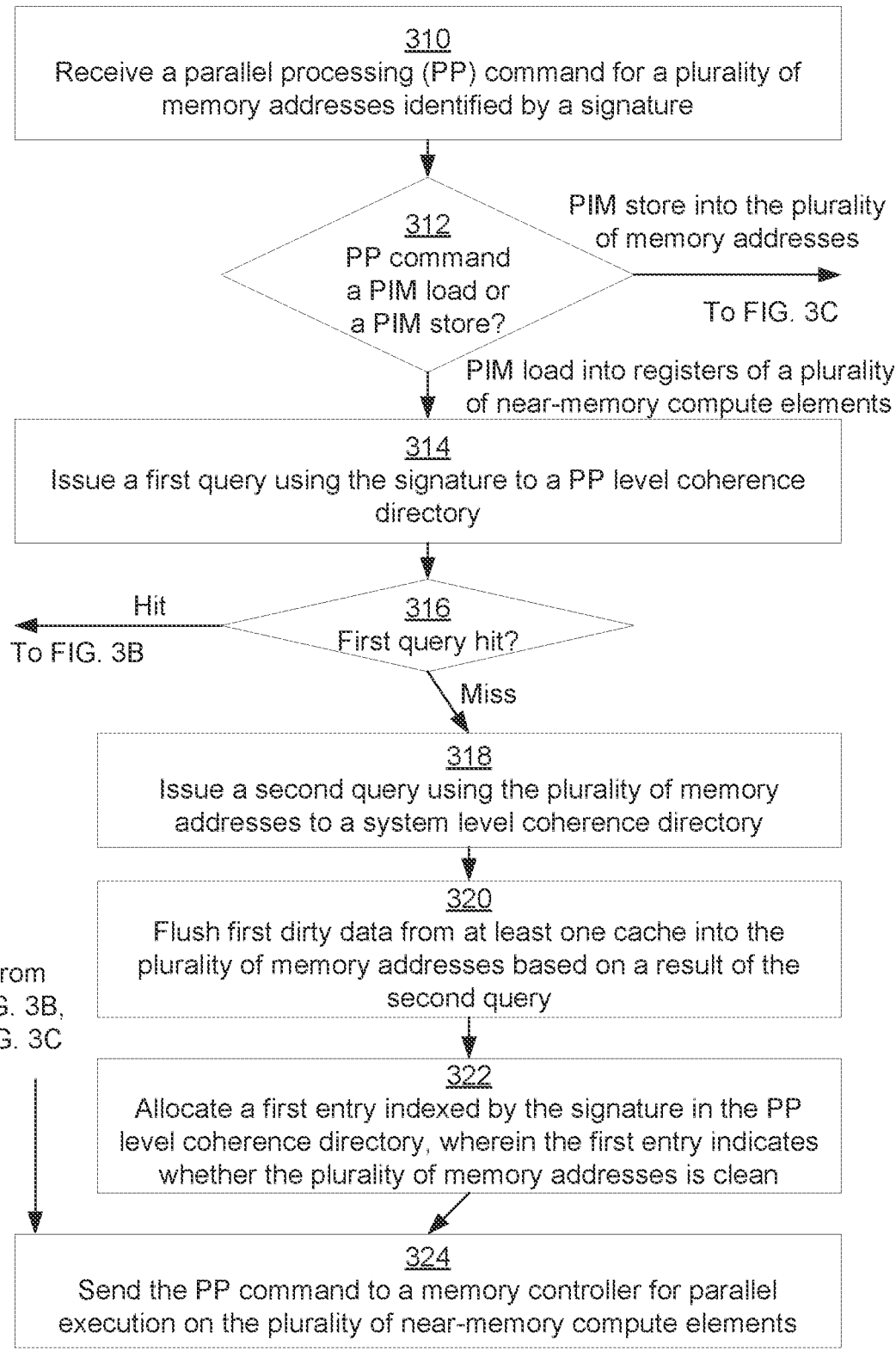

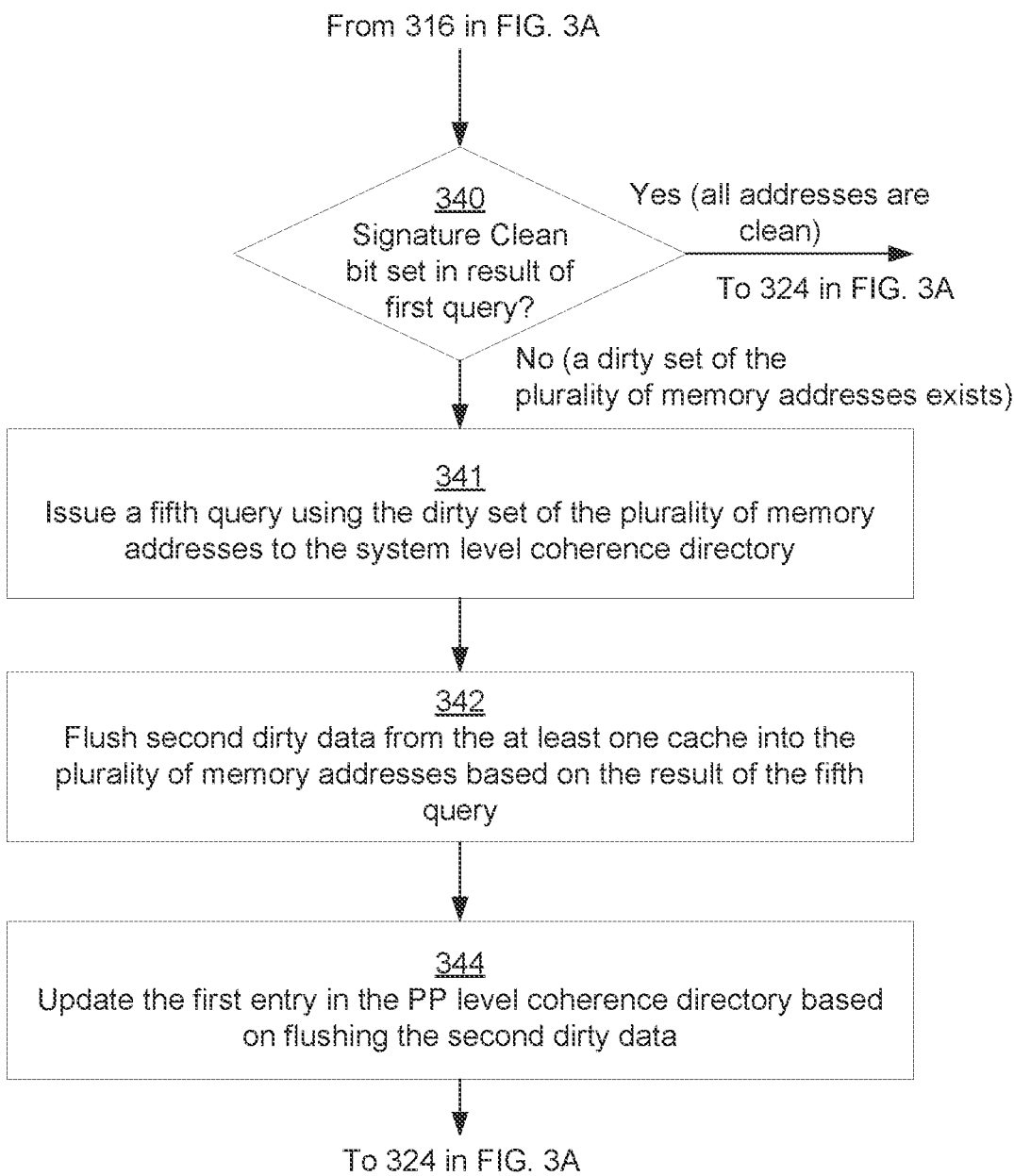

From 312 in FIG. 3A

360
Issue a third query using the signature to the PP level coherence directory

362
Issue a fourth query using the plurality of memory addresses to the system level coherence directory based on a result of the third query

364
Flush third dirty data from the at least one cache into the plurality of memory addresses based on a result of the fourth query

366
Invalidate clean data from the at least one cache based on the result of the fourth query

368
Allocate a second entry indexed by the signature in the PP level coherence directory in response to the second entry not already existing

370
Update the second entry to indicate the plurality of memory addresses are not cached To 324 in FIG. 3A

MECHANISM FOR REDUCING COHERENCE DIRECTORY CONTROLLER OVERHEAD FOR NEAR-MEMORY COMPUTE ELEMENTS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. Similarly, Processing Near Memory (PNM) technologies incorporate processing capability near memory modules so that tasks can be processed without costly round-trip transmission to host processors or other distant computing units. As used herein, the term near-memory compute elements or Processing Near Memory (PNM) may also refer to in-memory compute elements or Processing In Memory (PIM), and vice versa.

In the context of Dynamic Random-Access Memory (DRAM), an example PIM configuration includes vector compute elements and local registers that allow some computations to be performed locally in memory, such as arithmetic computations. This allows a memory controller to trigger local computations at multiple memory modules in parallel without requiring data movement across the memory module interface, which can greatly improve performance, particularly for data-intensive workloads.

One of the technical problems of offloading computations to memory, for example using PIM technology, is that while it reduces data bus traffic and computational burdens on processors, additional steps must be performed to ensure functional correctness. These additional steps include performing address checking at a coherence directory controller to determine whether any processor-side caches store data for an address that corresponds to a near memory-centric command and then flushing and/or invalidating any identified data. More specifically, if a cache stores dirty data for an address accessed by a near memory-centric command, the dirty data must be flushed from the cache to memory to ensure that the near memory-centric operation operates on the most recent version of data. If the cache stores clean data for the near memory-centric command that updated this data, the clean data must be invalidated to ensure that subsequent processor-side, compute-centric operations retrieve the results of the near memory-centric operations from memory instead of using stale data from cache.

To optimize performance benefits from the use of PIM technology, a memory controller can issue a broadcast PIM command to multiple target banks of a memory channel in parallel, causing the target banks to perform the same operation on the same respective memory cell (row, column). However, due to the functional correctness requirements as described above, each memory address targeted by the broadcast PIM command may require a lookup query in the coherence directory controller before the broadcast PIM command can proceed. Moreover, due to memory channel address interleaving and hardware-based PIM implementation requirements, each of the memory addresses may be referenced in separate directory entries that require individual lookups. These lookups may present a significant processing bottleneck, especially when servicing workstation and data center workloads that may generate numerous broadcast PIM commands.

There is, therefore, a need for a solution to the technical problem of how to reduce coherence directory controller overhead when processing broadcast PIM or PNM commands.

BRIEF DESCRIPTION OF THE DRAWINGS

Implementations are depicted by way of example, and not by way of limitation, in the figures of the accompanying drawings and in which like reference numerals refer to similar elements.

FIG. 2 is a block diagram that depicts example data structures for PimPF directories.

FIG. 3A, FIG. 3B, and FIG. 3C are flow diagrams that depict an approach for implementing PimPF in a coherence directory controller to service broadcast PIM requests with reduced overhead.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
  II. Architecture
  III. Broadcast PIM Commands
  IV. PimPF Coherence Directory Data Structures
  V. Using PimPF in a Coherence Directory Controller to Reduce Overhead
    A. Example Process using PimPF for PIM Loads
    B. Example Process using PimPF for PIM Stores
    C. Maintaining the PimPF Coherence Directory
  I. Overview An approach is provided for reducing coherence directory controller overhead for near-memory compute elements. According to the approach, a parallel processing (PP) level coherence directory, also referred to as a Processing In-Memory Probe Filter (PimPF), is added to a coherence directory controller. When the coherence directory controller receives a broadcast PIM command from a host, or a PIM command that is directed to multiple memory banks in parallel, the PimPF accelerates processing of the PIM command by maintaining a directory for cache coherence that is separate from existing system level directories in the coherence directory controller. The PimPF maintains a directory according to address signatures that define the memory addresses affected by a broadcast PIM command. The PimPF can be used with one or more system level directories. Two implementations of PimPF are described: a lightweight implementation that accelerates PIM loads into registers, and a heavyweight implementation that accelerates both PIM loads into registers and PIM stores into memory. This technical solution reduces the number of system level coherence directory lookups for broadcast PIM commands using near-memory computer elements.

The approach has broad applicability to different contexts. For example, when processing workloads that primarily issue PIM loads, the lightweight implementation provides the advantage of simplified implementation and reduced memory footprint. When processing workloads that also include significant PIM store activity, the heavyweight implementation may be preferred. Further, the memory consumption of the separate directory can be controlled by defining a maximum number of entries and evicting entries according to least recently used (LRU) entries or other eviction rules. By implementing the PimPF within existing coherence directory controllers, performance improvements can be provided for PIM while avoiding significant architectural changes.

II. Architecture

Figure 1A:
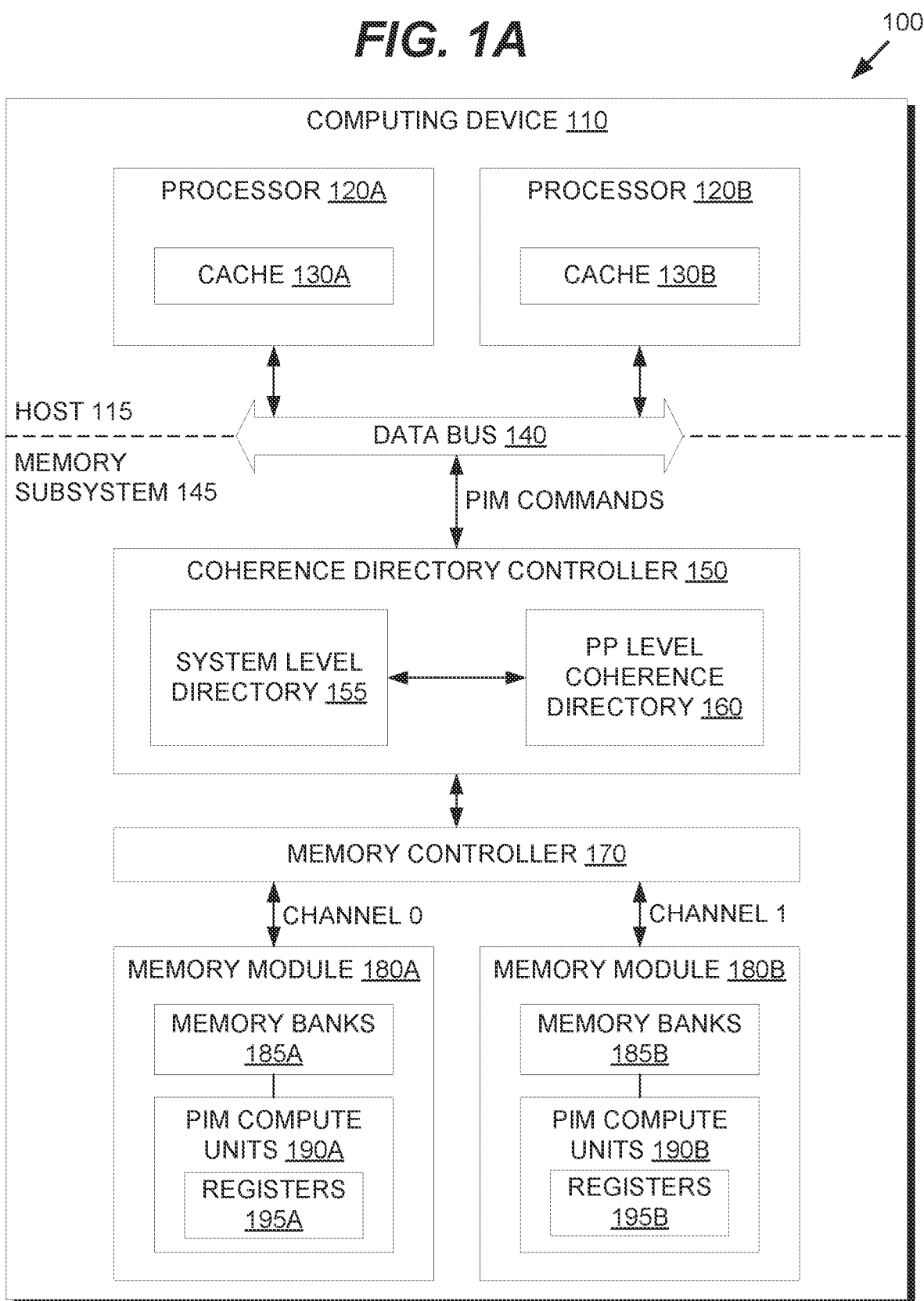
FIG. 1A is a block diagram that depicts an example system architecture for implementing a PIM Probe Filter (PimPF) in a coherence directory controller.

FIG. 1A is a block diagram that depicts an example system architecture 100 for implementing a PIM Probe Filter (PimPF), or PP level coherence directory 160 in coherence directory controller 150. Computing device 110 is implemented by any workstation or server with one or more processing units, such as general-purpose multicore processors and graphics processing units (GPUs). A processor 120A and processor 120B are shown in FIG. 1A, each with a corresponding cache 130A and 130B. The caches may each include multiple levels of cache, such as a L1, L2, and L3 cache. The processing units may be generally referred to as host 115.

Host 115 may send PIM commands over data bus 140 for eventual execution on PIM compute units 190A and 190B. Prior to that, components of memory subsystem 145 may perform various tasks to ensure functional correctness and to route PIM commands to the correct memory module 180A and 180B. For example, coherence directory controller 150 may perform lookups on system level directory 155 to ensure that PIM compute units 190A and 190B work on the latest and correct data. If system level directory 155 indicates that any cache lines in cache 130A or cache 130B are dirty, the dirty data should be flushed to memory banks 185A and 185B before a reading operation, such as with a PIM load command. Similarly, if system level directory 155 indicates data present in cache 130A or cache 130B is clean and the corresponding data in memory banks 185A and 185B is updated, e.g. by a PIM store command, then the cache entries should be invalidated in cache 130A and 130B so that host 115 does not work using stale data.

As previously discussed, since PIM commands may affect multiple memory addresses in parallel, a corresponding number of lookups at system level directory 155 may also be required for each PIM command. To reduce the number of lookups, PP level coherence directory 160 is introduced into coherence directory controller 150. The PP level coherence directory 160 maintains a separate directory that tracks cache coherence states at the granularity of PIM commands, which may target one or more memory banks of a memory channel, for example. When a future PIM command is received that is targeted at the same range of addresses as a previously recorded PIM command, the coherence states can be retrieved directly from the separate directory rather than querying system level directory 155 for every address of every PIM command. After coherence directory controller 150 can ensure functional correctness, the PIM command can be passed to memory controller 170 for distribution to PIM compute units 190A and 190B. For example, PIM loads may retrieve data from memory banks 185A and 185B into registers 195A and 195B, and PIM stores may store data from registers 195A and 195B into memory banks 185A and 185B.

III. Broadcast PIM Commands

Figure 1B:
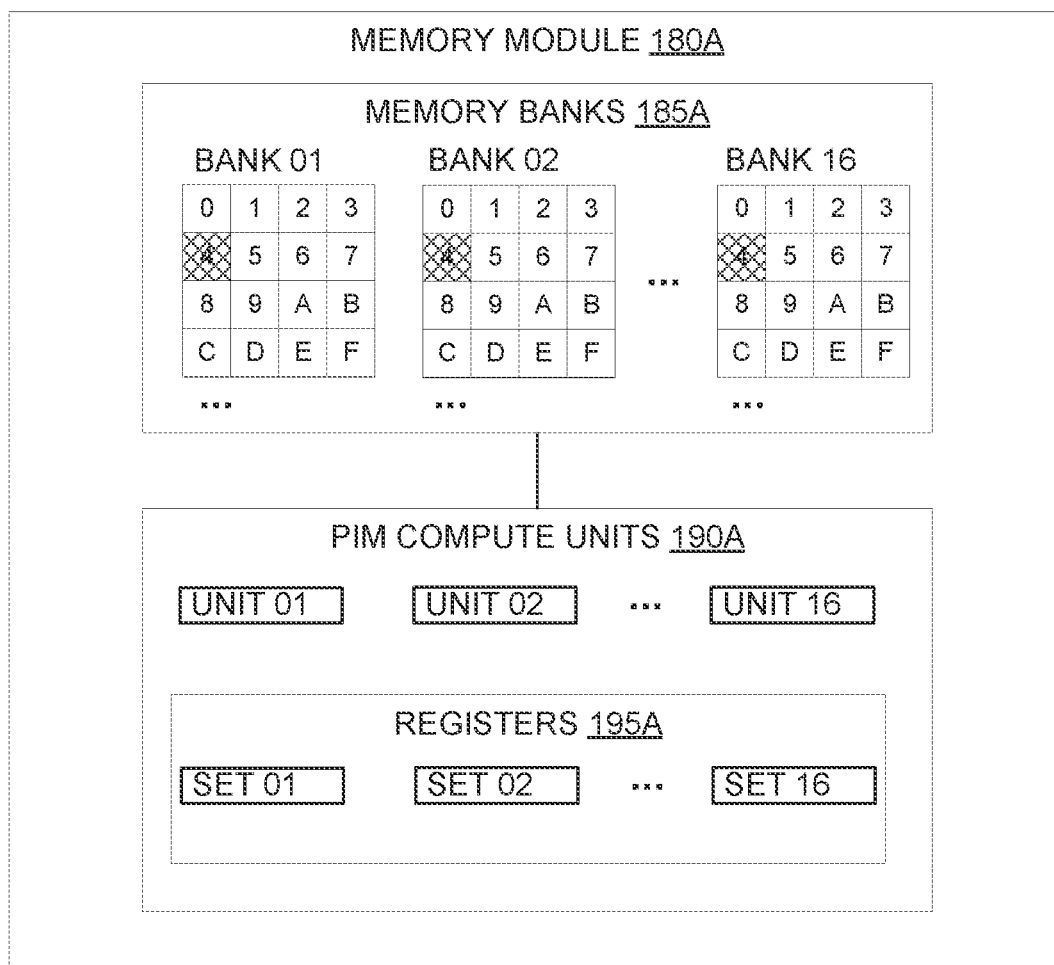
FIG. 1B is a block diagram that depicts an example memory module from FIG. 1A.

FIG. 1B is a block diagram that depicts memory module 180A from FIG. 1A. Memory banks 185A include 16 memory banks, which may each include 2048 memory cells each containing 32 bytes of data. For simplicity, only 16 memory cells are depicted for each memory bank. The specific quantities and sizes of memory banks, memory cells, memory modules, memory channels, etc. are exemplary and may be set according to application and hardware requirements.

When a PIM command is issued, the same command may be applied in parallel to the same cell in one or more banks of memory banks 185A. For example, if a PIM load is issued, then the contents of the same memory cell #4 as shaded may be retrieved in parallel from memory banks 01-16 and placed in corresponding register sets 01-16 in registers 195A. While this example operates on all available memory banks, some PIM commands may operate selectively on selected memory banks, which may be specified using a bit mask, lookup table, or other method. PIM store operations may store data from register sets 01-16 into banks 01-16 of memory banks 185A. Thus, both PIM loads and PIM stores may require actions by coherence directory controller 150 to ensure functional correctness. On the other hand, PIM arithmetic and logic operations may use processing units 01-16 to perform various arithmetic and logic operations using register sets 01-16 without accessing memory banks 185A. Thus, these arithmetic and logic operations may bypass any actions by coherence directory controller 150 to ensure functional correctness.

IV. PimPF Coherence Directory Data Structures

FIG. 2 is a block diagram that depicts example data structures for PimPF directories. Memory address configuration 250 defines the address space for memory subsystem 145. For example, bit 0 defines the memory channel, or channel 0/memory module 180A versus channel 1/memory module 180B. Bits 1-4 define the memory bank, or bank 01-16 within the selected memory channel. Bits 5-15 define the memory cell, or cell #0-2047, with each cell containing 32 bytes of data.

As discussed above, a PIM command may apply across multiple or all memory banks of a selected memory channel. Thus, the specific memory addresses that a PIM command is applied to can be identified using a signature, which can be the bits of memory address configuration 250 that exclude the memory channel and memory bank bits. Bits 0-4 can thus be excluded from the signature, resulting in bits 5-15. For example, 16 memory addresses can be derived from the signature by setting bit 0 (memory channel) to 0, iterating bits 1-4 (memory bank) from 0000, 0001. . . to 1111, and appending bits 5-15 (memory cell) from the signature to each memory address. When the PIM command applies to a subset of the memory banks, the iteration may only include the subset instead of all memory banks.

Since the memory addresses that a PIM command applies to can be derived from the signature, the directories in PP level coherence directory 260A-260B include entries that are identified using a signature. When a lookup query in PP level coherence directory 260A-260B is conducted, an entry is matched or not matched according to the signature column. PP level coherence directory 260A represents a lightweight implementation wherein a signature clean bit is specified for all memory addresses of the signature, whereas PP level coherence directory 260B represents a heavyweight implementation that specifies coherence indicators for each of the 16 memory banks identified by the signature, or 0/Not Cached, 1/Clean, and 2/Dirty, as indicated by coherence indicator legend 270. This data structure may be represented using, for example, a two-bit value for each memory bank. Additional bits may be reserved to indicate, for example, whether the memory address is referenced in one or more directories of system level directory 155, which can help to avoid unnecessary lookups when the result is known to be a miss. The higher granularity of PP level coherence directory 260B enables PIM stores to also benefit from reduced lookups to system level directory 155, as described in further detail below.

V. Using PimPF in a Coherence Directory Controller to Reduce Overhead

A. Example Process using PimPF for PIM Loads

FIG. 3A is a flow diagram that depicts a process 300 for implementing PP level coherence directory 160 in coherence directory controller 150 to service broadcast PIM requests with reduced overhead. In step 310, referring to FIG. 1A, PP level coherence directory 160 receives a parallel processing (PP) command for a plurality of memory addresses identified by a signature. For example, a program executing on processor 120A or 120B of host 115 may send a PIM command for memory channel 0 with a signature via data bus 140. As described above in FIG. 2, the signature may identify multiple memory banks for applying the PIM command in parallel.

In step 312, PP level coherence directory 160 determines whether the PP command is a PIM load or a PIM store. For this example, the PP command may correspond to a PIM load, and thus process 300 proceeds with step 314. The PIM load may, for example, read values from memory banks 185A-185B for loading into registers 195A-195B. In some implementations, a PIM command may be issued for PIM compute units 190A-190B to load and process data directly from memory banks 185A-185B without storage into registers 195A-195B.

In step 314, PP level coherence directory 160 issues a first query to itself using the signature. As discussed above, PP level coherence directory 160 may maintain a separate coherence directory from the existing system level directory 155, wherein the separate coherence directory may appear similar in structure to PP level coherence directory 260A or 260B. To avoid excessive lookups, PP level coherence directory 160 is first queried for any available coherence information before querying system level directory 155.

In step 316, PP level coherence directory 160 determines whether a result of the first query is a hit or miss. If the result is a hit, this indicates that a matching entry was found in PP level coherence directory 160, and further processing steps may be done as shown in FIG. 3B. If the result is a miss, this indicates that a matching entry is not found in PP level coherence directory 160, and steps 318, 320, and 322 are carried out to generate a new entry for the signature in PP level coherence directory 160.

In step 318, PP level coherence directory 160 issues a second query or queries using the plurality of memory addresses to system level directory 155. As discussed above, due to memory interleaving and hardware implementation, the plurality of memory addresses may require separate lookups, or 16 lookups when using the example of 16 memory banks in a memory channel. Based on the responses from system level directory 155, the coherence status of each memory address is now known, e.g. clean, dirty, or not cached. Further, the associated cache lines within cache 130A and/or cache 130B may also be identified.

In step 320, PP level coherence directory 160 flushes first dirty data from at least one of cache 130A and 130B into the plurality of memory addresses based on a result of the second query. For example, for each memory address marked as dirty in step 318, PP level coherence directory 160 may instruct host 115 to flush the corresponding dirty cache lines in cache 130A and/or cache 130B. The flush may result in memory write commands to update memory banks 185A and/or 185B with the latest data from cache 130A and 130B.

In step 322, PP level coherence directory 160 allocates a first entry within itself, wherein the first entry indicates whether the plurality of memory addresses is clean. As discussed in FIG. 2, the indicator may be lightweight by using a signature clean bit as shown in PP level coherence directory 260A, or the indicator may be heavyweight by using coherence indicators for each memory bank as shown in PP level coherence directory 260B. The signature clean bit indicates whether the entire signature is clean (set) or un-cached (unset), whereas the coherence indicators indicate whether each of the memory banks in the signature is clean, dirty, or not cached. Once the first entry is allocated, then any future PIM commands using the same signature may result in a hit at step 316, which may advantageously enable the avoidance of step 318, or querying system level directory 155.

In step 324, PP level coherence directory 160 sends the PP command, or PIM load, to memory controller 170 for parallel execution on PIM compute units 190A. Since the PP command is a PIM load, this corresponds to loading data from the memory addresses identified by the signature from memory banks 185A into registers 195A. Since the steps prior to step 324 in process 300 ensure functional correctness, step 324 can proceed to read the latest and correct data from memory banks 185A.

Assume that host 115 sends a new PP command for the same signature that was already recorded in step 322. Repeating process 300 may now result in a hit at step 316 rather than a miss. Referring to process 330 of FIG. 3B, in step 340, PP level coherence directory 160 determines whether a signature clean bit is set in the result of the first query. If the bit is set, this indicates that every memory address for the signature is marked as clean, and process 330 can therefore proceed directly to step 324 since no dirty data needs to be flushed. Accordingly, step 318 can be advantageously avoided. The signature clean bit may also be inferred by examining whether all the coherence indicators for a signature are set to "clean" or "not cached". Otherwise, if the signature clean bit is not set or at least one coherence indicator is not clean, which indicates that a dirty set of addresses exists, then process 330 proceeds to step 341.

In step 341, PP level coherence directory 160 issues a fifth query or queries using the dirty set of the plurality of memory addresses to system level directory 155. For example, if the signature clean bit is not set, then the coherence states of all the addresses are unknown and therefore the dirty set is indicated by all 16 addresses of the signature. In another example, the result of the first query may include coherence indicators as shown in PP level coherence directory 260B. In this case, the dirty set may be indicated from the result of the first query, or by including memory addresses of the signature that are marked with coherence indicator 2 for dirty. The dirty set may be queried to system level directory 155 to determine cache lines for flushing, whereas any remaining addresses marked as clean or not cached may omit querying system level directory 155. Note that the additional metadata provided by PP level coherence directory 260B may therefore reduce the number of lookups to system level directory 155, since only the dirty set is queried. When the dirty set is a subset of the addresses in the signature, then correspondingly fewer queries to system level directory 155 are issued. For example, if 1 memory address is marked as dirty in metadata for a signature associated with 16 memory addresses, then 1 query is issued in the fifth query, thereby avoiding 15 queries for the other addresses.

In step 342, PP level coherence directory 160 flushes second dirty data from the at least one of cache 130A and 130B based on the result of the fifth query. For example, the result of the fifth query may include cache lines that need flushing, and such action may be carried out.

In step 344, PP level coherence directory 160 updates the first entry within itself based on the flushing of the second dirty data. For example, if a signature clean bit is used, then it may be set to clean. If coherence indicators for memory banks are used, then the coherence indicators may be updated such that the flushed addresses are now clean. Process 330 may now proceed to step 324.

B. Example Process using PimPF for PIM Stores

In an example where the PP command sent from host 115 is a PIM store command, step 312 may instead proceed to FIG. 3C. Referring to process 350 of FIG. 3C, in step 360, PP level coherence directory 160 issues a third query using the signature to itself. Step 360 may be carried out similarly to step 316 as described above. In the case where the lightweight implementation is used, step 360 may be skipped since the information in the PP level coherence directory 160 may be insufficient to determine whether cached data exists to invalidate, and thus queries to system level directory 155 may occur as a matter of course.

In step 362, PP level coherence directory 160 issues a fourth query using the plurality of memory addresses to system level directory 155 based on the result of the third query. When step 360 is skipped and no result from the third query is available, then the fourth query is issued for each of the plurality of memory addresses. Similarly, when the third query is a miss, then each memory address is looked up since no information is available. If the third query is a hit and the heavyweight implementation is used, then the memory addresses that are "Not Cached" do not need to be looked up, since they do not trigger coherence issues. This provides a reduction in lookups for PIM stores at the cost of additional metadata storage required by the heavyweight implementation. Thus, the memory addresses that are "Clean" or "Dirty" may be looked up using system level directory 155 to determine specific cache lines for flushing or invalidation.

In step 364, PP level coherence directory 160 flushes third dirty data from at least one of caches 130A and 130B into the plurality of memory addresses based on a result of the fourth query. Thus, cache lines identified as dirty may be flushed from caches 130A and 130B.

In step 366, PP level coherence directory 160 invalidates clean data from at least one of caches 130A and 130B based on a result of the fourth query. Thus, cache lines identified as clean may be invalidated in caches 130A and 130B.

In step 368, PP level coherence directory 160 allocates a second entry indexed by the signature within itself when the second entry does not already exist. When the second entry already exists, step 368 is skipped.

In step 370, PP level coherence directory 160 updates the second entry to indicate that the plurality of memory addresses are not cached. Since the PIM store command will overwrite the data in the plurality of memory addresses, the caches will have outdated data and are therefore marked as "not cached". When using a lightweight implementation, then the signature clean bit may be set instead. Process 350 may then proceed to step 324.

C. Maintaining the PimPF Coherence Directory

Since the coherence directory controller 150 may also receive standard memory load/read and store/write commands, the effects of these commands should also be considered when maintaining the separate coherence directory in PP level coherence directory 160. For example, when using the lightweight implementation, when a standard memory store operation is received and a PimPF entry exists for the associated memory address, then the entry should be updated, e.g. by evicting the entry, or by resetting the associated signature clean bit, or by adjusting a coherence indicator for the associated memory address. Standard memory load operations can be ignored with respect to PimPF since the data in the memory is not modified. Further, while standard memory read/write operations may cause cache lines to be evicted, any tracked cache lines in the PimPF do not necessarily need to be updated in response to the evictions.

When using the heavyweight implementation, load instructions on the host may fetch a cache line that is tracked by PimPF. Thus, load instructions may trigger querying the PimPF to determine whether the cache line is tracked, and if so, the corresponding metadata or coherence indicator is set to "Clean". Similarly, store instructions on the host modify data in a memory address, and thus store instructions may trigger querying the PimPF to determine any entries that track the memory address, and the corresponding metadata or coherence indicator is set to "Dirty". Further, while standard memory read/write operations may cause cache lines to be evicted, any tracked cache lines in the PimPF do not necessarily need to be updated in response to the evictions.

The invention claimed is:

1. A method comprising:
   receiving a parallel processing (PP) command for a plurality of memory addresses identified by a signature;
   in response to the PP command being a load from the plurality of memory addresses into a plurality of near-memory compute elements:
      issuing a first query using the signature to a PP level coherence directory;
      in response to a result of the first query being a miss:
         issuing a second query using the plurality of memory addresses to a system level coherence directory;
         flushing first dirty data from at least one cache into the plurality of memory addresses based on a result of the second query; and
         allocating a first entry indexed by the signature in the PP level coherence directory, wherein the first entry indicates whether the plurality of memory addresses is clean; and
   sending the PP command to a memory controller for parallel execution on the plurality of near-memory compute elements.

2. The method of claim 1, further comprising:
   in response to the result of the first query being a hit:
      preventing the issuing of the second query in response to a signature clean bit being set in the result of the first query.

3. The method of claim 1, further comprising:
in response to the result of the first query being a hit and indicating a dirty set of the plurality of memory addresses:
issuing a fifth query using the dirty set of the plurality of memory addresses to the system level coherence directory;
flushing second dirty data from the at least one cache into the plurality of memory addresses based on the result of the fifth query; and
updating the first entry in the PP level coherence directory based on flushing the second dirty data.

4. The method of claim 1, further comprising:
in response to determining that the PP command is a store from the plurality of near-memory compute elements into the plurality of memory addresses:
issuing a third query using the signature to the PP level coherence directory;
issuing a fourth query using the plurality of memory addresses to the system level coherence directory based on a result of the third query;
flushing third dirty data from the at least one cache into the plurality of memory addresses based on a result of the fourth query;
invalidating clean data from the at least one cache based on the result of the fourth query;
allocating a second entry indexed by the signature in the PP level coherence directory in response to the second entry not already existing; and
updating the second entry to indicate the plurality of memory addresses are not cached.

5. The method of claim 4, wherein issuing the fourth query to the system level coherence directory is for each of the plurality of memory addresses that are indicated as clean or dirty in the PP level coherence directory.

6. The method of claim 1, wherein each entry in the PP level coherence directory includes a signature clean bit that indicates whether associated memory addresses in said each entry are (1) clean or (2) dirty.

7. The method of claim 1, wherein each entry in the PP level coherence directory includes data structures that indicate whether each associated memory address in said each entry is (1) not cached, (2) clean, or (3) dirty.

8. The method of claim 7, wherein the data structures further indicate whether each of the associated memory addresses has a corresponding entry in one or more granularity levels of the system level coherence directory.

9. The method of claim 1, wherein the plurality of near-memory compute elements are in-memory or near-memory compute elements.

10. The method of claim 1, wherein the plurality of memory addresses corresponds to a same memory cell of a plurality of memory banks of a selected memory channel.

11. The method of claim 10, wherein the plurality of memory banks corresponds to all memory banks of the selected memory channel.

12. The method of claim 3, wherein the dirty set is a subset of the plurality of memory addresses.

13. A coherence directory controller comprising processing logic configured to:
receive a parallel processing (PP) command for a plurality of memory addresses identified by a signature;
in response to the PP command being a load from the plurality of memory addresses into a plurality of near-memory compute elements:
issue a first query using the signature to a PP level coherence directory;
in response to a result of the first query being a miss:
issue a second query using the plurality of memory addresses to a system level coherence directory;
flush first dirty data from at least one cache into the plurality of memory addresses based on a result of the second query; and
allocate a first entry indexed by the signature in the PP level coherence directory, wherein the first entry indicates whether the plurality of memory addresses is clean; and
send the PP command to a memory controller for parallel execution on the plurality of near-memory compute elements.

14. The coherence directory controller of claim 13, wherein the processing logic is further configured to:
in response to the result of the first query being a hit:
prevent the issuing of the second query in response to a signature clean bit being set in the result of the first query.

15. The coherence directory controller of claim 13, wherein the processing logic is further configured to:
in response to the result of the first query being a hit and indicating a dirty set of the plurality of memory addresses:
issue a fifth query using the dirty set of the plurality of memory addresses to the system level coherence directory;
flush second dirty data from the at least one cache into the plurality of memory addresses based on the result of the fifth query; and
update the first entry in the PP level coherence directory based on flushing the second dirty data.

16. The coherence directory controller of claim 13, wherein the processing logic is further configured to:
in response to the PP command being a store from the plurality of near-memory compute elements into the plurality of memory addresses:
issue a third query using the signature to the PP level coherence directory;
issue a fourth query using the plurality of memory addresses to the system level coherence directory based on a result of the third query;
flush third dirty data from the at least one cache into the plurality of memory addresses based on a result of the fourth query;
invalidate clean data from the at least one cache based on the result of the fourth query;
allocate a second entry indexed by the signature in the PP level coherence directory in response to the second entry does not already existing; and
update the second entry to indicate the plurality of memory addresses are not cached.

17. The coherence directory controller of claim 13, wherein each entry in the PP level coherence directory includes a signature clean bit that indicates whether associated memory addresses in said each entry are (1) clean or (2) dirty.

18. The coherence directory controller of claim 13, wherein each entry in the PP level coherence directory includes data structures that indicate whether each associated memory address in said each entry is (1) not cached, (2) clean, or (3) dirty.

19. A non-transitory computer readable medium comprising instructions executable by a processor to:
receive a parallel processing (PP) command for a plurality of memory addresses identified by a signature;

in response to the PP command being a load from the plurality of memory addresses into a plurality of near-memory compute elements:
  issue a first query using the signature to a PP level coherence directory;
  in response to a result of the first query being a miss:
    issue a second query using the plurality of memory addresses to a system level coherence directory;
    flush first dirty data from at least one cache into the plurality of memory addresses based on a result of the second query; and
    allocate a first entry indexed by the signature in the PP level coherence directory, wherein the first entry indicates whether the plurality of memory addresses is clean; and
send the PP command to a memory controller for parallel execution on the plurality of near-memory compute elements.

20. The non-transitory computer readable medium of claim 19, wherein the instructions further cause:

in response to the PP command being a store from the plurality of near-memory compute elements into the plurality of memory addresses:
  issue a third query using the signature to the PP level coherence directory;
  issue a fourth query using the plurality of memory addresses to the system level coherence directory based on a result of the third query;
  flush third dirty data from the at least one cache into the plurality of memory addresses based on a result of the fourth query;
  invalidate clean data from the at least one cache based on the result of the fourth query;
  allocate a second entry indexed by the signature in the PP level coherence directory in response to the second entry does not already existing; and
  update the second entry to indicate the plurality of memory addresses are not cached.

* * * * *